United States Patent [19]

Hara et al.

[11] Patent Number: 4,970,707
[45] Date of Patent: Nov. 13, 1990

[54] OPTICAL TAPE APPARATUS WITH A TRACKING CONTROL MECHANISM AND/OR A FOCUSING CONTROL MECHANISM

[75] Inventors: Fumio Hara, Kodaira; Yoshito Tsunoda, Suginami; Shigeru Nakamura, Tachikawa; Yoshizumi Eto, Sagamihara; Seiichi Mita, Tsukui; Morishi Izumita, Inagi; Hiroyuki Tsuchinaga, Kokubunji; Masuo Kasai, Hachioji, all of Japan

[73] Assignee: Hitachi, Ltd., Tokyo, Japan

[21] Appl. No.: 239,389

[22] Filed: Sep. 1, 1988

[30] Foreign Application Priority Data

| Sep. 4, 1987 | [JP] | Japan | 62-220231 |
| Oct. 23, 1987 | [JP] | Japan | 62-266362 |
| Feb. 3, 1988 | [JP] | Japan | 63-21950 |
| Apr. 13, 1988 | [JP] | Japan | 63-89047 |
| May 25, 1988 | [JP] | Japan | 63-125724 |

[51] Int. Cl.$^5$ ............................................. G11B 7/00
[52] U.S. Cl. ............................... 369/44.11; 369/44.17
[58] Field of Search ........................... 369/32, 43–47, 369/97, 100, 112, 115, 116, 119, 57, 58, 44.11, 44.17; 358/345, 347

[56] References Cited

U.S. PATENT DOCUMENTS

| 4,642,803 | 2/1987 | Drexler | 369/111 X |
| 4,807,213 | 2/1989 | Chung et al. | 369/46 |
| 4,811,316 | 3/1989 | Hosoya | 369/43 X |

Primary Examiner—Robert L. Richardson
Attorney, Agent, or Firm—Antonelli, Terry, Stout & Kraus

[57] ABSTRACT

An optical tape apparatus having improved focus and tracking control. An optical head records, reproduces, or rewrites data on an optical tape by helically scanning the tape with a laser beam. A guide plate is disposed between the optical head and the tape to prevent the beam from becoming unfocused due to fluctuation of the tape cuased by an air film between the optical head and the tape. The optical head contains a semiconductor laser and an optical system exhibiting chromatic aberration for directing the laser beam onto the tape. The optical system includes a condenser lens for focusing the beam onto the tape. Fine focus control is achieved by changing the wavelength of the laser beam by directing part of the beam reflected from the tape back to the laser, thereby changing the focal point of the beam by virtue of the chromatic aberration of the optical system. Coarse focus control is achieved by mounting the condenser lens on a piezoelectric actuator which moves the consenser lens to focus the beam onto the tape. A recording head for recording timing marks and tracking signals on the tape is disposed in advance of the optical head. A reading head reads the timing marks and the optical head reads the tracking signals. The timing marks and tracking signals are used to control the operation of the apparatus such that the tape is transported with a constant speed and data on diagonal signal tracks on the tape is accurately recorded, reproduced, or rewritten.

26 Claims, 11 Drawing Sheets

→ REPRODUCING SIGNAL

OPTICAL TAPE APPARATUS WITH A TRACKING CONTROL MECHANISM AND/OR A FOCUSING CONTROL MECHANISM

BACKGROUND OF THE INVENTION

This invention relates to an optical tape apparatus for recording, reproducing or re-writing data to and from a tape-like optical recording medium by use of a laser spot, and more particularly to an optical tape apparatus which will be suitable for automatic focusing control and tracking control of an optical VTR (Video Tape Recorder) for recording, reproducing or re-writing data.

A magnetic recording medium has been used generally as a recording medium of data. In comparison with this magnetic recording medium, an optical recording medium using a laser beam for recording and reproducing data, such as an optical disk, has the advantage in that non-contact high density recording can be made.

In the apparatuses which use the tape of the magnetic medium, a magnetic tape that travels at a lower speed is wound helically on a drum that rotates at a higher speed so that signals can be recorded diagonally on the tape and signals such as high frequency video signals can be recorded for a long time. This system is known as a "helical scanning method" and has gained a wide application in VTRs (Video Tape Recorders) for home use in general.

Heretofore, an apparatus has been known which records the data on a tape-like optical recording medium in the same way as the helical scanning method described above to attain high density recording and records large quantities of data such as images for a long time. Such an apparatus is disclosed, for example, in Japanese Patent Laid-Open Nos. 273745/1986, 8339/1987 and 109233/1987.

Since high density recording is possible in VTRs using the optical recording medium, such VTRs will be applied to recording and reproduction of video data for a high-definition television in future.

In order to make the VTR structure compact, one or a plurality of heads must be assembled inside a drum and rotated.

In the VTRs using the magnetic recording medium, the drum rotates at from 1,800 to 5,400 rpm and records a high frequency signal. Similarly, the drum must rotate at the same number of revolution as above and record high frequency signals in a high density on the optical recording medium, too. To simplify the structure of the recording optical system, the optical head must be located in the drum. In the optical tape apparatus using the tape-like optical recording medium, the fluctuation of revolution or wobbling of the drum of about 10 μm is expected when the drum is rotated.

In the VTRs using the tape of the magnetic recording medium, the tape travels at a low speed of from 100 to 300 mm/sec on the drum which rotates at 1,800 to 5,400 rpm. For this reason, a nonuniform gap h as shown model-wise in FIG. 24 develops between the drum and the tape depending on the unbalance of the dynamic pressure distribution of an air-film generated by tape tension and the rotation of the drum. In the case of the tape of the magnetic recording medium, recording and reproduction of the data signals can be made stably because the magnetic head for recording and reproducing the data signals projects beyond this gap h and comes in substantial contact with the tape.

In the case of the optical recording medium, however, the signals are recorded and reproduced by focusing or condensing a laser beam to a diameter of about 1 μm by use of a focusing or condenser lens and consequently, high density recording becomes possible. On the other hand, since the size of the optical spot to be condensed on the optical recording medium is small, recording and reproduction of the data signals will not be stable if any oscillation occurs in the direction of the focus of the optical head due to fluctuation or wobbling of rotation of the drum during the travel of the tape. If the wavelength of the laser beam is $\lambda$ and the numerical aperture of the condenser or objective lens is represented by NA, the depth of field or focal depth of the condensed laser spot is approximately to $\lambda/(NA)^2$. Assuming that a semiconductor laser beam having a wavelength of 830 nm is used and NA of the condenser or objective lens is 0.5, then the focal depth is about $\pm 1.7$ μm. Therefore, unless the tape oscillation during the travel of the tape is kept below this value, the size of the laser spot will fluctuate and recording and reproduction of the signals cannot be made stably.

In the case of the optical recording medium, if the non-uniform gap such as shown in FIG. 24 exists, the focal position deviates with the rotation of the drum and this results directly in the error of focus. Furthermore, the tape will oscillate very delicately due to the pressure fluctuation inside this gap and to the fluctuation of the tape travel.

Accordingly, the focus must be adjusted on the optical tape by an automatic focusing control mechanism. This automatic focusing control is referred to as "AF", and drives the condenser lens in the focal direction by use of a voice coil motor using the same principle as that of speakers so as to absorb the tape fluctuation.

In the optical tape apparatus, the drum has a diameter of about 60 mm and a number of revolution of from 1,800 to 5,400 rpm, for example. Since the signals are recorded on the optical tape, the condenser lens must be disposed near the outer periphery of the drum. Assuming that the lens is positioned at the outermost periphery of the drum which rotates at 5,400 rpm, the centrifugal force is about 1,000 G.

In other words, if the weight of the condenser lens is 5 g and the distance from the center of the drum to the condenser lens is 30 mm, the centrifugal force of about 5 kg acts on the condenser lens. If the position of the condenser lens is offset by this centrifugal force, unnecessary power will be required in the driving circuit of the automatic focusing servo system in order to correct this offset or the error of automatic focusing will remain.

In the optical recording medium, recording and reproduction of signals are made by directly condensing the laser beam to a diameter of about 1 μm by the lens and high density recording can be made accordingly. However, since the dimension of the data recorded on the optical recording medium is too small, tracking of the data track as the target must be made accurately at the time of recording and reproduction. Particularly when the data recorded by the helical system is recorded and reproduced, the data track becomes discontinuous whenever the drum rotates once. Therefore, accurate tracking becomes a critical problem though it has not been the critical problem in the case of the recording and reproduction head using an electromagnet for the magnetic recording medium, where a width of as large as about 20 μm is secured in the tracking direction.

In the case of the tape-like optical recording medium, in particular, the optical recording medium travels while being wound helically on the drum and for this reason, there is a great possibility that the fluctuation of the tape travelling speed occurs, and accurate tracking of the data track as the target becomes difficult at the time of recording and reproduction of the signals.

In comparison with a rotary disk such as an optical disk, the speed fluction is more likely to occur in the tape-like recording medium when the tape travels, and it is more difficult to transfer the guide track from a master the same as in the optical disk.

The prior art technique described already does not much consider the guide track for recording and reproducing accurately the data to and from the target position, and involves the problem in the tracking at the time of recording and reproduction of the data.

As described above, the prior art technique does not much consider the prevention of the fluctuation of the tape travel and the adverse influences of the centrifugal force resulting from the high speed rotation of the optical head on the actuator. It further involves the problem in automatic focusing control and tracking control.

Various actuators have so far been proposed in the optical disks. However, at many times the optical head is substantially at rest relative to the disk at the time of recording and reproduction of the signals, and a voice coil motor using a parallel leaf spring, a voice coil motor using a rotary type slide bearing, a galvanomirror, and the like, have mostly been used for the actuator. In the case of the optical tape, the optical head component(s) positioned on the outer periphery of the drum must have high rigidity because a large centrifugal force acts on them. Particularly, the actuator which makes automatic focusing control and tracking control by adjusting the position of the condenser lens must have a structure providing a sufficient stroke and having high rigidity.

SUMMARY OF THE INVENTION

It is therefore a primary object of the present invention to provide an optical head which is simple in structure but can withstand a large centrifugal force, and to provide an optical tape apparatus which suppresses the oscillation in the focal direction during the tape travel and has a guide track mechanism an automatic focusing control mechanism and a tracking control mechanism which make it possible to record, reproduce and erase accurately and stably the data to and from the target position of the tape.

In accordance with the first characterizing feature of the present invention, a guide plate for keeping stability of tape travel is disposed between a rotating drum and a tape to suppress the fluctuation of tape travel, and automatic focusing control having high rigidity and capable of withstanding a large centrifugal force resulting from high speed rotation becomes possible by use of automatic focusing control utilizing the technique of changing the wavelength of a semiconductor laser to change the focal position and by utilizing automatic focusing control by an actuator of a piezoelectric oscillator. Furthermore, a condenser lens support member is fitted in advance in the offset arrangement on the inner peripheral side of the drum so that the centrifugal force acting on an condenser lens system when the drum rotates at a rated speed and the elastic force of the condenser lens support member balance with each other near the focal point of the optical spot. Since the structure capable of moving in the track direction is employed for this piezoelectric oscillator, tracking control having high rigidity can be made, too.

In accordance with the second characterizing feature of the present invention, position data for detecting the travelling speed of the tape are recorded on a tape in every predetermined interval by another head or the like disposed separately from an optical head for recording and reproducing data, data for guiding the track is recorded accurately on a target position on the basis of the position data described above, and the signals and addresses of data are recorded accurately at the target positions by the optical head for recording and reproducing the data signals on the basis of these signals.

Recording, reproduction or re-writing of signals is made when the semiconductor laser is condensed as a very small optical spot on the optical recording medium. When part of the reflected beam from the recording medium is returned to the semiconductor laser, the recording medium and the semiconductor laser constitute therebetween an external resonator. If the condenser lens has chromatic aberration of the image point, the oscillation wavelength of the semiconductor laser changes in accordance with the distance fluctuation due to the resonance effect of the semiconductor laser as described in U.S. Pat. No. 4,725,721 so that the recording medium is positioned on the plane of the focal point of the condenser lens. Accordingly, there can be obtained the effect which is the same as one obtained by finely adjusting the position of the condenser lens for the purpose of focus control. However, this focusable range is as small as a few microns and focusing cannot be made if the drum greatly fluctuates eccentrically or if the tape fluctuates on the drum during its travel. Accordingly, the present invention disposes the guide plate between the drum and the tape to suppress the fluctuation of the tape during its travel.

The fluctuation having a low frequency but high amplitude such as eccentricity of the drum is tracked by the actuator of the piezoelectric oscillator and only a high frequency fluctuation component below several microns is followed by the change of the wavelength of the semiconductor laser so that high precision focus control can be made with a simplified structure of the control system of the piezoelectric oscillator.

The actuator for focus control is positioned near the outer periphery of the drum in order to change the position of the condenser lens. However, since the piezoelectric oscillator has higher rigidity than the parallel leaf spring or the like, it can withstand the centrifugal force resulting from high speed rotation.

However, the problem of the centrifugal force resulting from the high speed rotation can be eliminated by the two-stage focus control mechanism utilizing the piezoelectric oscillator and the change of the wavelength of the semiconductor laser because it provides high rigidity. Though the piezoelectric oscillator undergoes displacement due to the centrifugal force, the influence of the centrifugal force can be cancelled if it is offset in advance in the opposite direction, and the automatic focusing servo system corrects only the change of the distance between the optical head and the optical tape so that focus control can be effected stably.

On the other hand, a condenser lens having chromatic aberration becomes necessary to cause the wavelength change of the semiconductor laser. However, since this lens having chromatic abberation is generally composed of the combination of a plurality of lenses, there is the possibility that deformation of the lenses occurs due to the large centrifugal force if the condenser lens provided with chromatic aberration is disposed at the outer periphery of the drum and rotated at a high speed.

The condenser lens having chromatic aberration can make focus control by the phenomenon described above at any position of the external resonator formed by the semiconductor laser and the recording medium.

Therefore, if chromatic aberration is provided to a collimator lens for converting the beam leaving the semiconductor laser to a parallel beam, it need not be disposed at the outer peripheral portion of the drum unlike the condenser lens for forming the optical spot, when the collimator lens having chromatic aberration is used as a component of the optical head of the optical tape apparatus, and can be positioned at the inner peripheral portion of the drum. Accordingly, it is not affected by the large centrifugal force resulting from the high speed rotation of the drum and the optical recording medium can be positioned near the focal plane of the condenser lens by changing the wavelength of the semiconductor laser by the effect of chromatic aberration of the collimator lens.

Since the condenser lens can then be constituted by a single lens such as an aspherical single lens, the influence of the large centrifugal force resulting from the high speed rotation is small.

The optical tape travels at a low speed on the drum, which rotates at a high speed. In other words, a tape guide and a capstan rotate while keeping contact with the optical tape so that the optical tape is wound correctly on the drum and travels at a constant speed. Therefore, if a plurality of heads for recording a timing mark signal representing guide position data and a guide tracking signal are disposed on the tape guide and are rotated in synchronism with the travel of the optical tape to record these signals, the equidistant timing mark signals and guide tracking signals are always recorded on the optical tape even when any fluctuation occurs in the travelling speed of the optical tape. When the data is recorded, the timing mark signals are reproduced by a magnetic head, for example, disposed near the drum, and the travelling speed of the optical tape is controlled so that they have a predetermined time interval, and the optical head for recording the data is located in accordance with the guide tracking signal. In this manner, the signals are recorded at the target positions. Therefore, cross-talk or leak from adjacent tracks can be minimized when the data recorded with a very small track pitch on the order of a micron are reproduced or re-written, and the target signal recording track can be tracked stably on the basis of the recorded address signal.

In the same way as focus control, tracking control is generally made by the following two methods. The one moves the condenser lens in the tracking direction and the other oscillates the laser beam as in the galvanomirror. The optical tape travels at a low speed while being wound on the drum. Since the drum rotates at a high speed, the fluctuation of the track is mostly low frequency fluctuation. Accordingly, stable tracking can be expected with moving the condenser lens by using an actuator comprising a piezoelectric oscillator for tracking control because the influences of the centrifugal force resulting from the high speed rotation is small.

DESCRIPTION OF THE PREFERRED EMBODIMENTS

Although the following embodiments of the invention will deal with the case where a post-script type recording medium which makes recording and reproduction of data signals by irreversible change such as opening of holes on the recording film by the heat of a laser on the optical tape or generation of the change of a crystalline structure, the present invention can be applied without deteriorating its essence to those cases which use a re-writable recording medium by phase change, optical magnetism, or the like.

Figure 1:
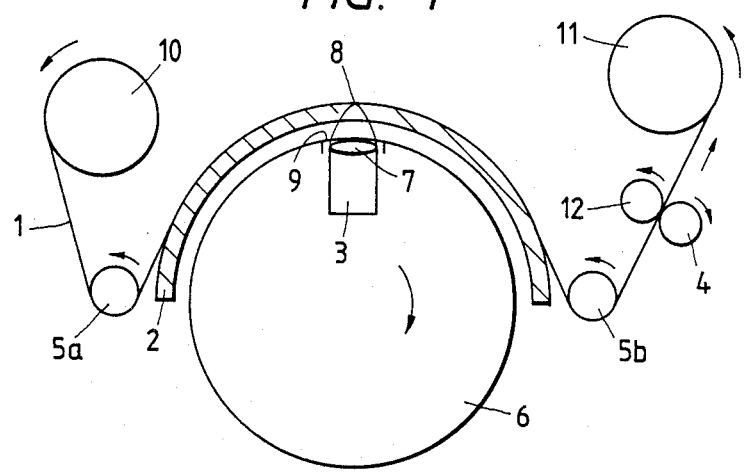
FIGS. 1 to 5 are plan views each showing an optical tape apparatus in accordance with an embodiment of the present invention.

FIG. 1 is a partial sectional plan view showing one embodiment of the present invention. The optical tape 1 wound on reels 10, 11 is caused to travel at a low speed of from about 100 to about 300 mm/sec, for example, by a capstan motor 4 and roller 12 while being wound on a guide plate 2 which is made of a transparent material having a very smooth surface such as glass or plastic resin and which is at rest, and while keeping contact with tape guides 5a, 5b in such a manner that data signals can be recorded and reproduced by an optical head 3. One or a plurality of optical heads 3 (only one head is shown disposed in the drawing) are incorporated in the drum 6 and are adjusted so that the focal position of the condenser lens 7 exists on the tape through a slit 9 or the like disposed at part of the drum 6. This drum 6 rotates at from 1,800 to 5,400 rpm, for example. Incidentally, the detailed structure of the optical head 3 will be described later with reference to FIG. 6 et seq.

When the drum 6 rotates, an air flow is generated but since this air flow, is intercepted by the guide plate 2 which is rest, the optical tape 1 travels stably with less fluctuation. The condenser lens 7 is designed so that it forms the optical spot 8 on the optical tape 1 through the transparent guide plate 2 and makes recording and reproduction of data signals. Therefore, the focus is established on the optical tape 1 if the guide plate 2 is from 1 to 2 mm thick.

The optical tape 1 travels at a low speed on the stationary guide plate 2. Since this guide plate 2 is elongated, fluctuation of a few microns might occur in the direction of focus. As previously described, however, the condenser lens 7 has a depth of focus, and focus control can be made within the range of $\pm 12$ $\mu$m as proposed in U.S. Pat. No. 4,725,721 if a semiconductor laser (not shown) is used as the light source of the optical head 3 and if a lens having chromatic aberration is used as the condenser lens 7 and part of the reflected beam of light is fed back to the semiconductor laser. Therefore, stable recording and reproduction of the data signals becomes possible without disposing an AF (Automatic Focusing) control mechanism.

The data signals are recorded by radiating the optical spot on the recording film deposited on the optical tape 1 and opening the holes by the heat of the laser, for example. Since the optical tape 1 is generally as thin as from 10 to 20 $\mu$m in order to increase the volume capacity, the heat transfers to the recording film both when the plane of the focus of the condenser lens 7 exists on the contact surface of the optical tape 1 and the guide surface plate 2 and when it exists on the opposite surface of the optical tape. The recording film may be deposited to either side of the optical tape, and it is not particularly limitative in the present invention.

In this embodiment, recording can be made more easily on the opposite side to the contact surface of the optical tape 1 and the guide plate 2 in order to bore the holes on the recording film.

Reproduction of the data signals is carried out by detecting the change of the intensity of the reflected beams due to the existence of holes by disposing a photo detector or an analyzer (not shown) for receiving the reflected beams to the optical head 3. In this embodiment, the material of the optical tape 1 must be transparent in order to detect the existence of the holes on the optical tape 1. However, the present invention can be applied also to the transparent and opaque tape materials, and does not limit, in particular, the tape materials.

Figure 2:
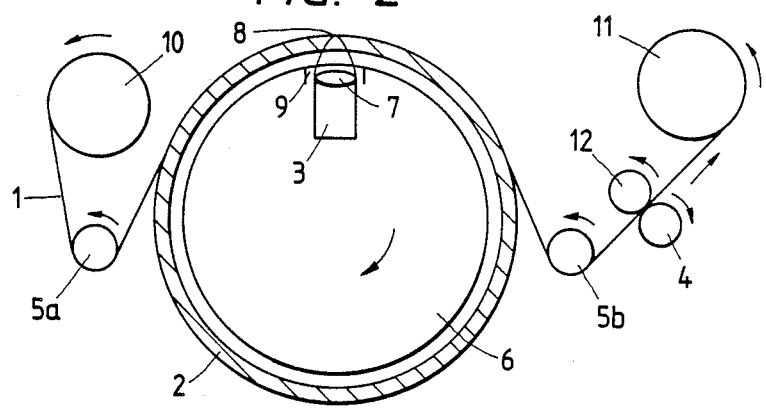

FIG. 2 is a partial sectional plan view showing another embodiment of the present invention. In this embodiment, the stationary guide plate 2 consists of a cylindrical transparent material which is from 1 to 2 mm thick. Since the drum 6 and the guide plate 2 are concentric with each other, alignment of their centers becomes easier. Therefore, when the drum 6 rotates, accuracy of locating the optical tape 1 onto the focus of the condenser lens 7 can be improved over a wider range where the optical tape 1 is in contact with the guide plate 2, and recording and reproduction of the data signals can be further stabilized.

Figure 3:
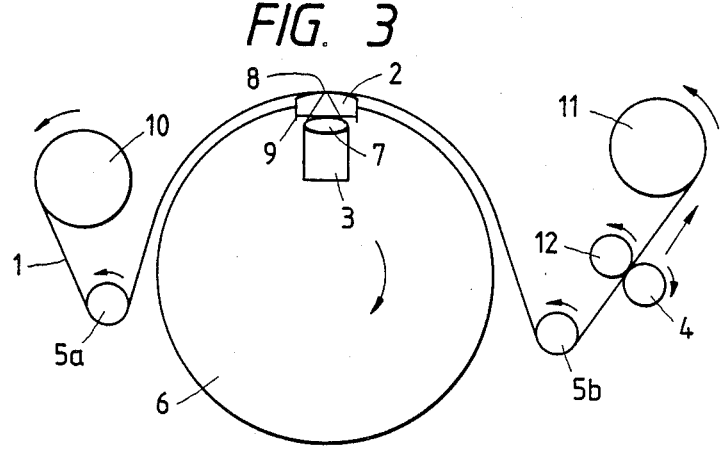

FIG. 3 is a plan view showing still another embodiment of the present invention. In this embodiment, the guide plate 2 projects from the slit 9 of the drum 6 and recording and reproduction of the data signals is made by the optical head 3 while the guide plate 2 is in contact with the optical tape 1.

Since the drum 6 rotates at a high speed of from 1,800 to 5,400 rpm, for example, the guide plate 2 might come into high speed contact with the optical tape 1. In such a case, only one of the features of optical recording, that is, the feature in high density recording, is utilized without utilizing the other feature, that is, non-contact recording and reproduction. The high speed rotation contact between the guide plate 2 and the optical tape 1 itself does not render a critical problem in consideration of the facts that in the tape-like recording medium, the tape is wound on reels 10, 11 and is caused to travel while keeping contact with the capstan motor 4 and the tape guides 5a, 5b and that in VTRs using the tape of a magnetic medium, the tape is durable to the wear of the magnetic head.

The thickness of the guide plate 2 is set to be from 1 to 2 mm so that the optical spot 8 is focused on the optical tape 1.

Figure 4:
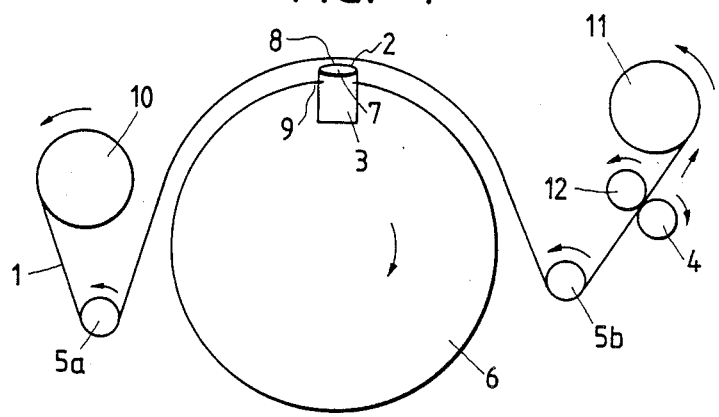

FIG. 4 is a plan view showing still another embodiment of the present invention. In this embodiment, the condenser lens 7 is incorporated integrally in the guide plate 2 and when the drum 6 rotates at a high speed, the optical tape 1 and the condenser lens 7 come into mutual contact. Though resistance of wear is required for both the optical tape 1 and the condenser lens 7, the resistance of wear may be at such a level equivalent to that of the magnetic tape medium.

In this case, the condenser lens 7 must be designed so that the optical beam outgoing from the condenser lens 7 establishes the focus on the optical tape 1, but it is possible to obtain the advantage that the number of necessary components can be reduced by one.

Figure 5:
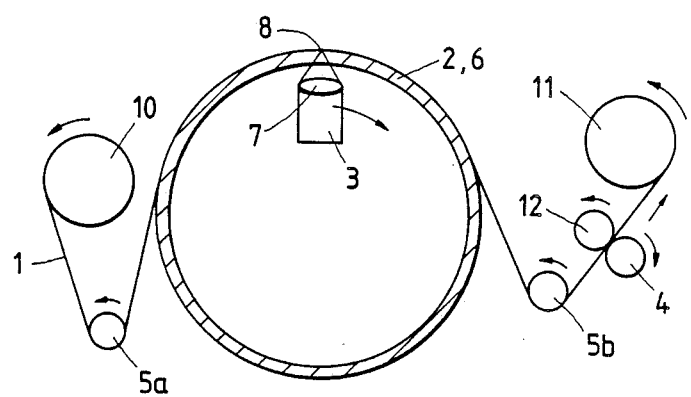

FIG. 5 is a plan view showing still another embodiment of the present invention. In this embodiment, the drum 6 is made of glass or plastic resin having a very smooth surface which is from 1 to 2 mm thick and is arranged stationary while only the optical head 3 is rotated.

This embodiment provides the advantage that the number of necessary components becomes small because the drum 6 serves also as the guide plate 2.

Incidentally, in the description of the embodiments of the present invention, a lens equipped with cover glass which forms the focus through a 1 to 2 mm thick transparent substrate and a lens without cover glass are used as the condenser lens, but these lenses are not particularly limitative in the present invention.

Transparent and opaque materials must be selected as the materials of the optical tape in accordance with the optical system of recording and reproduction of the data signals, but the present invention can be applied to any of these materials without deterioration of its essence.

Though the number of optical heads is only one in the description of the embodiments of the invention, the present invention is not particularly limited thereto.

Figure 6:
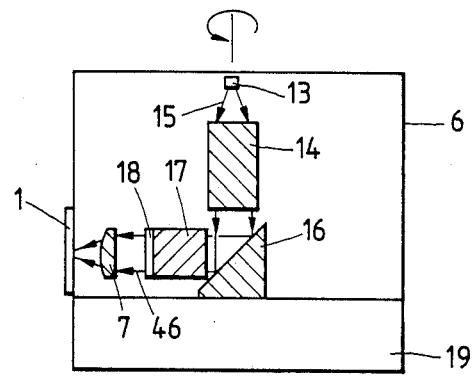
FIGS. 6 to 9 are sectional side views each showing an optical head used in the embodiment of the present invention.

FIG. 6 is a sectional side view showing an example of the optical head used in one embodiment of the present invention. The laser beam 15 outgoing from the semiconductor laser 13 is converted to a parallel beam by a collimator lens 14 having chromatic aberration and is contracted as a very small spot onto the optical tape 1 using the optical recording medium through optical components such as a mirror 6, a polarizing prism 17, a ¼ wavelength plate 18, the condenser lens 7, and the like. The drum 6 is rotated at a high speed by a motor 19 and the tape 1 travels at a low speed while being wound helically on the drum 6, so that helical scanning is effected to record diagonally the data signals on the optical tape 1. The reflected beam 46 from the optical tape 1 is divided by the ¼ wavelength plate 18 and the polarizing prism 17 into the beam on the side of the semiconductor laser 13 and on the side of the photo detector (not shown) and returned to the semiconductor laser 13.

The returning beam to the semiconductor laser 13 forms an external resonator. Therefore, if the optical tape 1 fluctuates due to oscillation resulting from the axial fluctuation or wobbling of the drum 6 or the like and deviates from the position of the focus of the condenser lens 7, the wavelength of the semiconductor laser 13 changes on the basis of the chromatic aberration of the image point and along therewith, the focus of the condenser lens 7 moves onto the optical tape 1. The range where this change of focus can be followed changes with the quantity of chromatic aberration of the collimator lens 14, but can be designed to be about 10 μm which is the rotating fluctuation of the drum of VTRs.

The drum 6 has a diameter of about 60 mm and its number of revolutions is from about 1,800 to about 5,400 rpm. Therefore, the centrifugal force at its outer periphery is as great as about 1,000 G. However, the centrifugal force due to the rotation of the drum hardly acts on the collimator lens 14 because it is disposed near the center of the rotating shaft.

The signals that are recorded as the holes on the optical tape 1 are detected as the returning light quantity to brightness and darkness to the photo detector (not shown) and can be reproduced stably because they are always positioned on the focal plane of the condenser lens 7.

Figure 7:
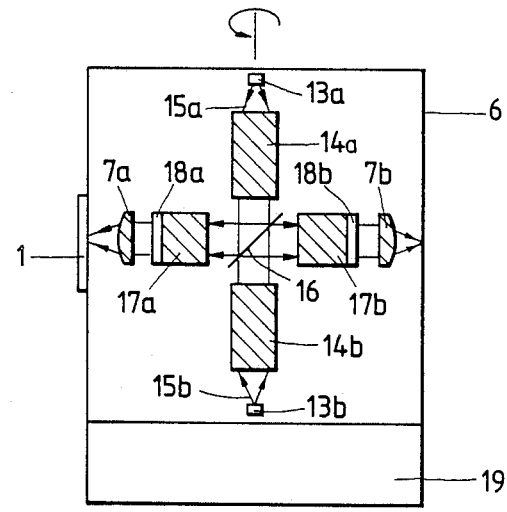

FIG. 7 is a sectional side view showing another example of the optical head used in the present invention. In this embodiment two laser beams are emitted from two semiconductor lasers 13a, 13b disposed in a vertical direction and signals are recorded respectively on the optical tape 1 by two condenser lenses 7a, 7b disposed symmetrically inside the drum through two collimator lenses 14a, 14b having chromatic aberration. Since the optical systems such as the condenser lenses 7a, 7b are disposed symmetrically with respect to the rotating shaft of the drum 6 in this case, any unbalance that occurs due to the rotation of the drum 6 becomes small and consequently, assembly and adjustment of the optical head become easier.

Figure 8:
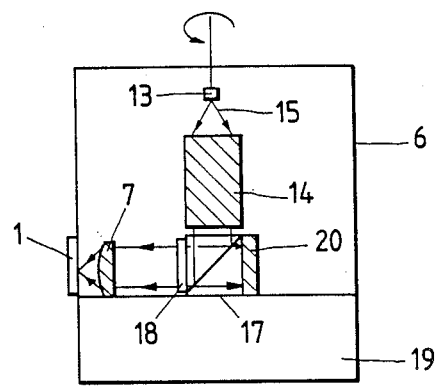

FIG. 8 is a sectional side view showing still another example of the optical head used in the present invention. In this case, the laser beam 15 leaving the collimator lens 14 is bent by the polarizing prism 17 and condensed on the optical tape 1 through the ¼ wavelength plate 18. The reflected beam from the optical tape 1 is separated by the ¼ wavelength plate 18 and returned to the photo detector 20 and to the semiconductor laser 13. Since the optical components other than the condenser lens 7 exist at the center of rotation of the drum 6, the large centrifugal force does not act on the optical components and assembly and adjustment, supporting method of the optical head, and the like, become easier.

Figure 9:
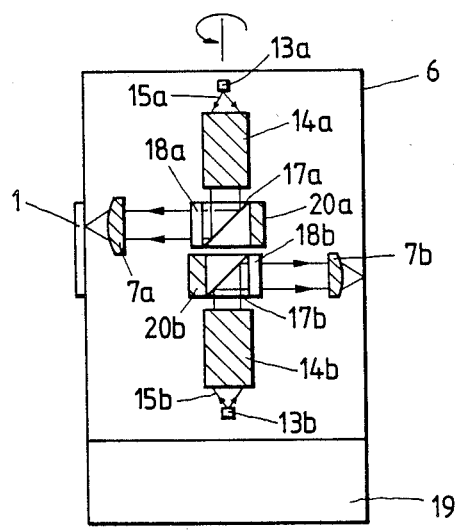

FIG. 9 is a sectional side view showing still another example of the optical head used in the present invention. In this embodiment, two of the optical heads shown in FIG. 8 are disposed in such a manner as to face each other in the vertical direction, and almost all the optical components exist at the center of rotation of the drum 6 and are disposed symetrically inside the drum 6 with respect to its axis of rotation. Therefore, adjustment of the unbalance of the optical heads, their assembly adjustment and support method become more easier.

Since the condenser lenses 7a, 7b deviate from each other in this embodiment, the signals recorded by the two optical heads get discontinuous. Therefore, it is necessary to use a signal processing circuit for editing the signals so that the signals are recorded and delivered continuously.

Though various modifications can be made for the disposition of the optical components of the optical head and signal processing means as described above, the present invention is not particularly limited thereto.

Though the description of the foregoing embodiments uses the collimator lens having chromatic aberration, the degree of chromatic aberration represents the focus control following range and its value is not particularly limitative.

As to the semiconductor laser, the present invention can be applied to array-like lasers emitting a plurality of laser beams without deteriorating its essence.

In the description given above, the signals are recorded while the drum and the optical tapes are in mutual contact. However, the present invention can be applied without deterioration of its essence to the focus control mechanism where the stationary guide plate is disposed between the drum and the optical tape and the optical tape travels thereon.

Though the description given above does not mention the tracking control mechanism necessary for reproducing or re-writing the recorded signals, the tracking control mechanism will be described elsewhere.

Figure 10:
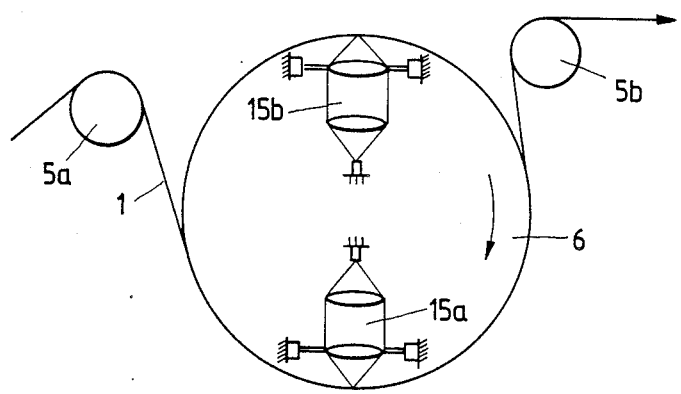
FIG. 10 is a sectional view showing part of the optical tape apparatus in one embodiment of the present invention.

FIG. 10 shows still another embodiment of the present invention. Though this embodiment will be described about the case where a phase change film is used as the tape-like recording medium, the present invention can be applied to other recording media without deteriorating its essence. Though the structure of the optical head will be simplified in this embodiment for the purpose of description, the present invention is not limited by the structure of the optical head.

Figure 11:
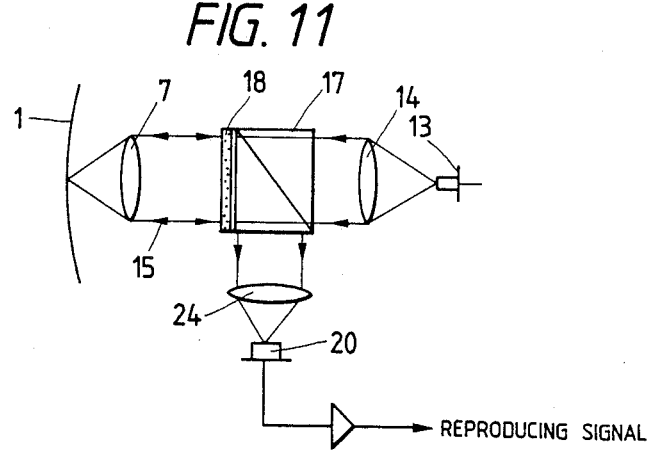
FIG. 11 is an explanatory view showing in detail the structure of the optical head.

The optical tape 1 moves at a low speed while being wound helically on the rotating drum 6 and helical scanning is effected by the optical head 3 inside the drum 6 along the guide track (not shown) that is in advance recorded on the optical tape 1 to record the signals. Since the optical heads 3 are disposed symmetrically inside the drum 6 relative to the rotating shaft, they rotate stably without unbalance. The focus of the optical head 3 might deviate from the optical tape 1 beyond the level that can be absorbed by the guide plate 2 and the wavelength change of the semiconductor laser 13 depending on the degree of roundness of the drum 6 and eccentricity of the center of rotation. The focus control of the optical heads 3 is made in such a manner as to follow up this focus deviation. The structure of the optical head 3 is shown in detail in FIG. 11. The beam from the semiconductor laser 13 as the light source passes through the collimator lens 14 for roundly shaping the flat beam of the semiconductor laser, the polarizing prism 17, the ¼ wavelength plate 18 and the condenser lens 7 and is thus condensed as a very small optical spot 8 on the optical tape 1. When the signal is recorded, the intensity of the semiconductor laser 13 is increased and the signal is recorded because the reflection factor of the recording film (not shown) on the optical tape 1 is changed (phase change) by the very small spot 8 condensed by the condenser lens 7.

Since the reflected beam from the optical tape 1 passes again through the ¼ wavelength plate 18, its polarizing direction changes and its part reaches the photo detector 20 through lens 24 so that the signal is reproduced. Part of the reflected beam returns to the emitting part of semiconductor laser 13 if the ¼ wavelength plate 18 is adjusted. When the optical tape 1 fluctuates and its focus deviates if the condenser lens 7 or the collimator lens 14 has chromatic aberration, the phenomenon, where the focus is moved to the deviated position of the optical tape 1 and its oscillation wavelength is changed so as to increase intensity of light, occurs as described already.

Figure 12:
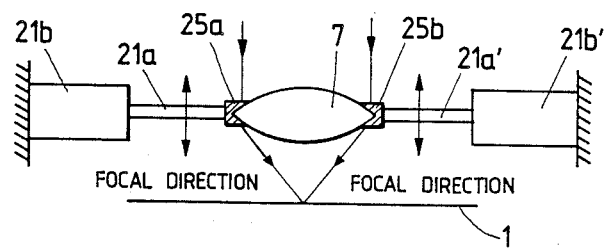
FIG. 12 is an explanatory view showing in detail the optical head representing an actuator in one embodiment of the present invention.

This focus following range varies with the degree of chromatic aberration but is generally about a few microns. Therefore, an actuator using a piezoelectric oscillator 21a such as shown in FIG. 12 is employed so as to follow up the fluctuation or wobbling of a few microns or more such as eccentricity due to the rotation of the drum 6. As shown in FIG. 12 which is an enlarged view, the piezoelectric oscillator includes piezoelectric oscillator 21a having a bimorph structure that is disposed on both sides of the condenser lens 7 so as to change and move the condenser lens 7 in the focal direction. Each piezoelectric oscillator 21a is fitted crisscross to a piezoelectric oscillator 21b having a bimorph structure in order to further change the condenser lens 7 in the tracking direction. High frequency oscillation occurs in the focal direction due to the surface coarseness of the optical tape 1 and due to the gap change between the drum 6 that rotates at a high speed and the optical tape 1 that moves slowly at a constant speed, but the piezoelectric oscillator 21a follows up only the low frequency change due to eccentricity of the drum 6 or the like and the focus tracking by the wavelength change of the semiconductor laser described already is made for a more delicate change. Therefore, high precision focus control becomes possible.

On the other hand, since the tape 1 travels slowly at a constant speed while the drum 6 rotates at a high speed, the track deviation quantity results in the low frequency fluctuation or wobbling in the tracking direction and this can be followed up by only the piezoelectric oscillator 21b.

Both the piezoelectric oscillator 21a and 21b have high rigidity and are not therefore affected by the centrifugal force resulting from the high speed rotation, and high precision focus control as well as tracking control become possible.

Figure 13:
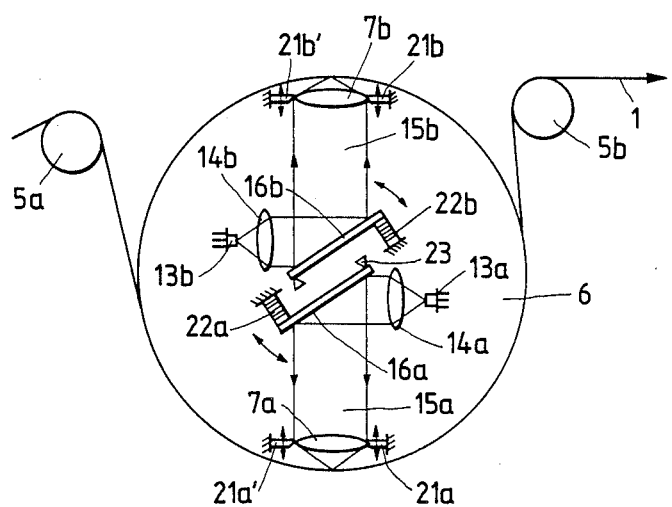
FIG. 13 is a sectional view showing part of the optical tape apparatus in accordance with another embodiment of the present invention.

FIG. 13 is a sectional view showing part of the optical tape apparatus in accordance with still another embodiment of the present invention. In this embodiment, the focus control is made by moving the condenser lens 7 in the focal direction by piezoelectric oscillator 21 having a bimorph structure while the tracking control is made by oscillating the mirror 16 by a laminated type piezoelectric oscillator 22. Because the mirror 16 and the oscillator 22 are positioned at the center of the drum 6, the centrifugal force acting on the support portion 23 of the mirror 16 is small and rigidity of the support portion 23 may therefore be low.

Though the piezoelectric oscillator 21 for the focus control is positioned at the outer peripheral portion of the drum 6, it has high rigidity so that it can withstand the centrifugal force and stable focus control becomes possible.

Figure 14:
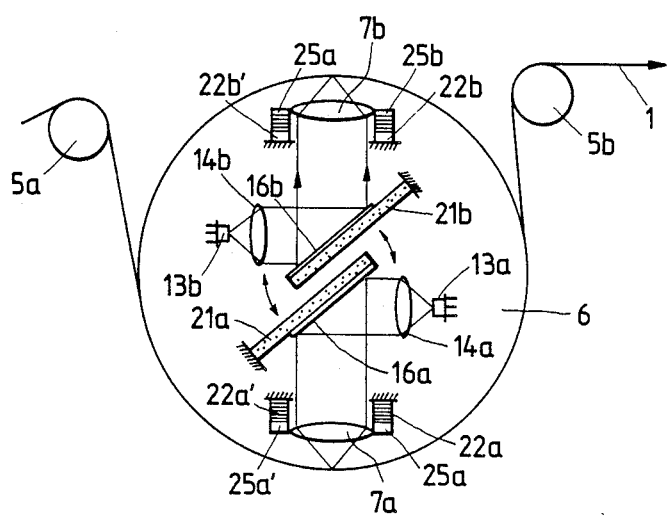
FIG. 14 is a sectional view showing part of the optical tape apparatus in accordance with another embodiment of the present invention.

FIG. 14 is a sectional view showing part of the optical tape apparatus in accordance with still another embodiment of the present invention. In this case, focus control is made by moving the condenser lens 7 in the focal direction by the piezoelectric oscillator 22 laminated in the ring-like form. Since shaped in the ring-like form, the oscillator 22 has high rigidity. Tracking control is made by the mirror 16 fitted to the surface of the piezoelectric oscillator 21 having the bimorph structure. The swing angle of the mirror 16 can be made great due to the bimorph structure.

Figure 15:
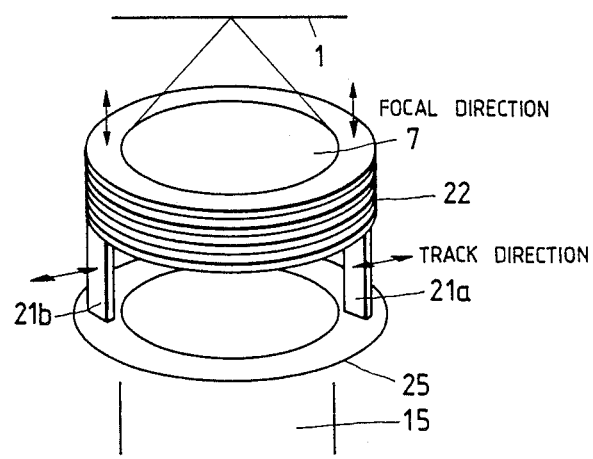
FIG. 15 is a partial perspective view of a contracting lens portion representing the actuator in one embodiment of the present invention.

FIG. 15 is a partial perspective view showing the condenser lens portion in still another embodiment of the present invention. Focus control is made by moving the condenser lens 7 in the focal direction by the piezoelectric oscillator 22 laminated in the ring-like form. This oscillator 22 is fixed to the piezoelectric oscillator 21 having the bimorph structure and tracking control is made by moving this oscillator 21 having a parallel leaf spring structure in the tracking direction.

Though the description of the foregoing embodiments uses two optical heads that rotate inside the drum for the sake of description, no unbalance will develop if an even-numbered optical heads are disposed, and they may be disposed with their center of rotation being symmetric with each other. Therefore, the number of optical heads is not particularly limitative.

The piezoelectric oscillators having various combined structures may be used for focus control and for tracking control. The present invention is not particularly limited to the structure of the piezoelectric oscillator. Depending on the numerical aperture of the condenser lens, there may be the case where the piezoelectric oscillator can follow up the fluctuation inside the focal depth in the case of focal control and in such a case, focus control by means of the wavelength change of the semiconductor laser described already need not be employed.

Figure 16:
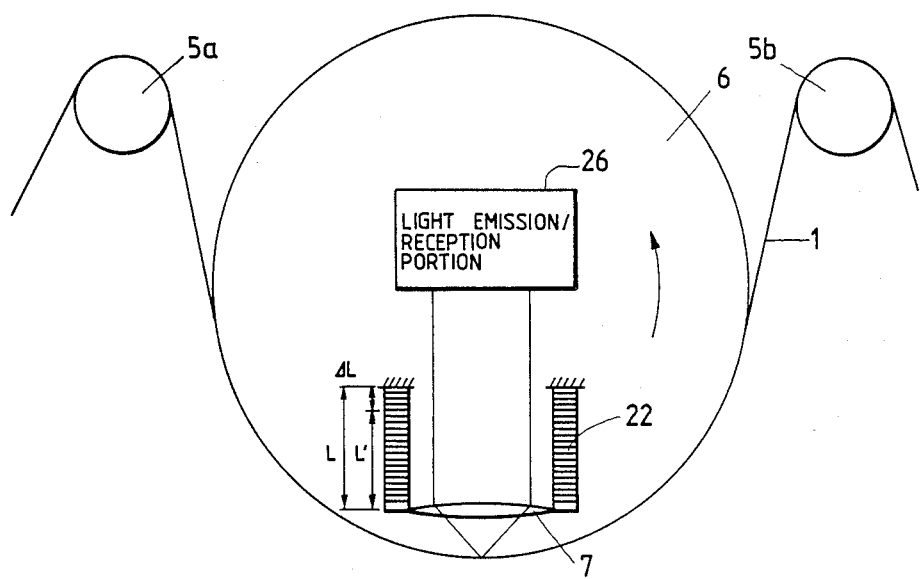
FIG. 16 is a plan view of the optical head portion which is useful for explaining the embodiment of the present invention.

FIG. 16 is a partial sectional view showing still another embodiment of the present invention. In order to represent clearly the structure of the present invention, this embodiment shows the overall structure of the optical head in simplification and only one optical head is disposed inside the drum. However, the present invention is not particularly limited to its structure or to the number of optical heads.

The optical tape 1 moves at a low speed while being wound helically on the rotating drum 6 through the tape guides 5a, 5b. The optical spot is formed on the optical tape 1 by the light emission/reception portion 26 and the condenser lens 7 and helical scanning is made along the guide tracks (not shown) recorded in advance on the optical tape 1 in order to record, reproduce or re-write the data signals. When the focus of the condenser lens 7 deviates from the optical tape 1 depending on the roundness of the drum 6 or to the eccentricity of the rotation center of the drum, the automatic focus controller, not shown, drives the piezoelectric oscillator 22 supporting the condenser lens 7 and makes automatic focus control in such a manner as to correct this focus deviation by changing the distance between the condenser lens 7 and the optical tape 1.

When the drum 6 is rotating at a rated speed, the distance L between the condenser lens 7 and the fixing portion of the piezoelectric oscillator 22 to the drum 6 is elongated by the length ΔL which is determined by the centrifugal force acting on the condenser lens 7, the size of the piezoelectric oscillator 22 and its Young's modulus in comparison with the length L' when the drum 6 is at halt. Therefore, the piezoelectric oscillator 22 is fixed in advance so as to deviate by this length ΔL from the optical design position at the time of the stop of the drum.

In this embodiment, the support member of the condenser lens serves also as the actuator of the condenser lens, but they may be separate in the present invention.

Though the embodiment described above uses the piezoelectric oscillator 22 as the actuator, the present invention can be applied to other actuators without deteriorating its essence.

Though the guide plate 2 is not disposed in the description of the embodiments shown in FIGS. 10 and 13 to 16, the present invention can be applied without deteriorating its essence to the case where the guide plate 2 is disposed. If the guide plate 2 is disposed in these embodiments, the fluctuation of the optical tape 1 during its travel becomes small so that focusing control becomes easier and higher precision focusing control becomes feasible.

Figure 17:
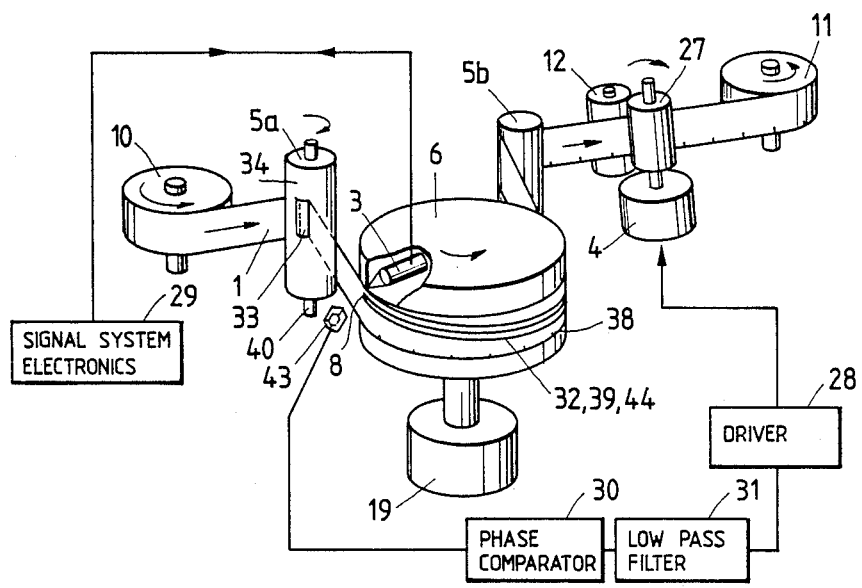
FIG. 17 is a partially exploded perspective view of the optical tape apparatus in one embodiment of the present invention.

FIG. 17 is a partial exploded perspective view showing still another embodiment of the present invention. Hereinafter, the tracking control mechanism will be explained in detail. In this embodiment, though a re-writable magneto-optical recording media will be shown used for the optical tape, the present invention can be applied without deteriorating its essence to other recording media such as phase change optical recording media.

The tape guides 5a, 5b are disposed in front, and at the back, of the drum 6 incorporating the optical head 3 so that the optical tape 1 can travel correctly at a predetermined speed at a predetermined position of the drum 6. Reference numeral 4 represents a capstan motor which drives the capstan 27 for driving the optical tape and which is driven by a driving circuit or driver 28. Reference numeral 10 represents a feed reel of the optical tape 1 and reference numeral 11 does its take-up reel. Reference numeral 29 represents a signal processing circuit or signal system electronics and reference numerals 30 and 31 represent a phase comparator and a low-pass filter, respectively.

Figure 18:
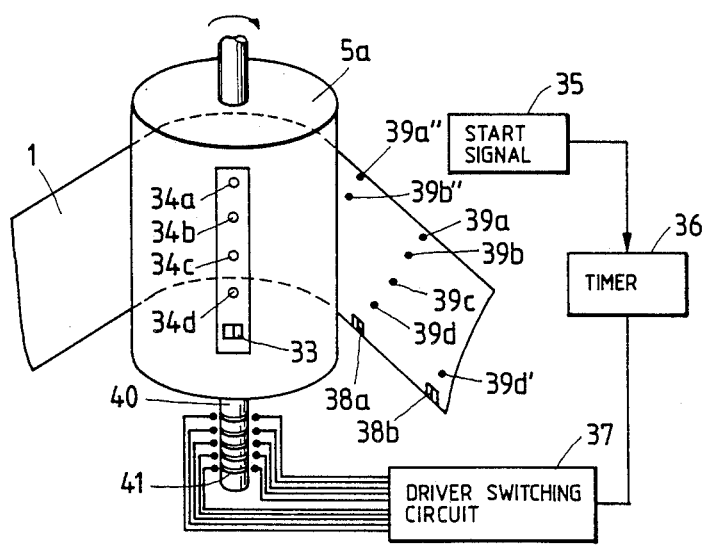
FIG. 18 is an enlarged view showing a tape guide portion of the embodiment of FIG. 17.

The optical head 3 for recording, reproducing or re-writing one or a plurality of data signals is assembled in the drum 6, rotates integrally with the drum at a high speed of from 1,800 to 5,400 rpm and records the signals on the tracks disposed diagonally on the optical tape 1. The optical tape 1 is moved slowly by the capstan motor 4 while keeping contact with the tape guide 5a. The tape guide 5a rotates slowly due to the contact frictional force with the optical tape 1 and can rotate in synchronism with the travelling speed of the optical tape 1. In other words, the tape guide 5a rotates at a high speed when the optical tape 1 travels at a high speed. As shown in FIG. 18 which is a simplified illustration for the purpose of description, a magnetic head 33 and four optical heads 34 (34a, 34b, 34c, 34d) each consisting of the semiconductor laser and the condenser lens (not shown) are buried in the surface of the tape guide 5a. A timer 36 is actuated by use of a start signal 35 at the time of the start of the travel of the optical tape 1 as a trigger, and the magnetic head 33 and the optical heads 34 buried in the tape guide 5a are operated by a driver switching circuit 37 so as to record the A4 marks 38 and tracking signals or guiding track signals 39 inside the area where they are in contact with the optical tape in a predetermined interval per revolution of the tape guide 5a. Recording by the magnetic head 33 is made by, for example, changing the direction of the magnetic field of the perpendicular magnetic film coated on the optical tape 1 so as to record the timing marks 38 (38a, 38b, ...) representing the position data, while recording by the optical heads 34 is made by the laser heat to record the guiding track signals 39 (39a, 39b, 39c, 39d, 39a', ...) on the optical tape 1. Since the optical tape 1 travels very slowly, the timing marks 38 and the guiding track signals 39 assume accurate predetermined intervals.

The rotating magnetic head 33 and optical head 34 are driven by electrodes 41 corresponding to the number of heads disposed on a rotating shaft 40 in the same way as the brush of a d.c. motor rotation or in the method which utilizes the change of magnetic field in VTRs.

Figure 19:
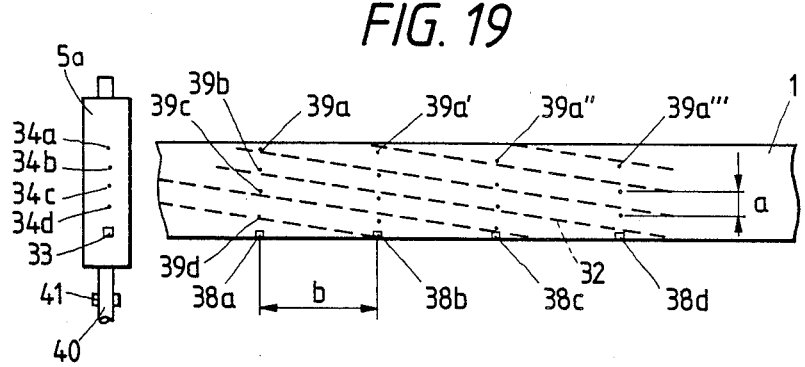
FIG. 19 is an explanatory view of timing marks and guide tracking signals on the optical tape in the embodiment of FIG. 17.

FIG. 19 shows the timing marks 38 and the guiding track signals 39 recorded on the optical tape 1. Recording is made in the form of a checkerboard and the guiding track signals 39 are alternately arranged to the right and left of the track 32 when the optical head 3 records the data signals 42 diagonally to the optical tape 1. As will be described later, the guiding track signals 39 are positioned on the right and left to the track 32 so that a pre-recorded sampled clock servo method becomes possible and stable tracking is effected.

Here, sampled clock servo tracking will be described. In the present invention, data are recorded by the helical scan system on the optical tape 1 wound on the drum 6. Therefore, the optical beam rotates with the center of the drum 6 being the support point. Accordingly, if a 3-spot system wherein one laser beam is divided into three beams as used in a CD player, for example, the optical system will get complicated. An optical system capable of tracking by one optical beam is therefore desired. In the present invention, the sampled servo tracking system by the buried clock is employed.

Figure 22:
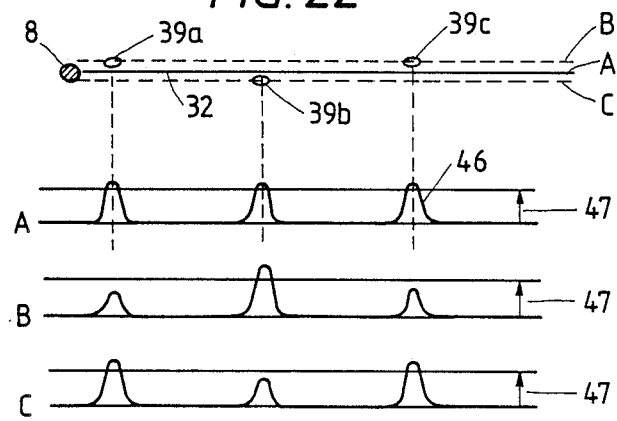
FIG. 22 is an explanatory view useful for explaining the detection principle of tracking.

The detection principle of tracking is as follows. Namely, the reflected beam 46 from the optical tape 1 shown in FIG. 22 is detected by an photo detector 20a for tracking shown in FIG. 23. If the guiding track signal 39 exists, the reflected beam 46 from the optical tape 1 becomes different between when the optical spot 8 passes on the track 32 (FIG. 22 - A) and when it deviates to the right or left of the track (FIG. 22 - B) If feedback is made to the galvanomirror 16 for deviating the optical spot 8 to the right and left so that the level 47 of this reflected beam 46 gets balanced on the right and left of the track 32 in the optical head shown in FIG. 23, for example, the optical spot 8 is always positioned on the track 32. The detection principle is based on this phenomenon. The characterizing feature of the tracking system described above lies in that since the total light power level is detected by the photo detector 20a for tracking, it is possible to distinguish the unbalance of the reflected beam 46 resulting from the inclination of the optical tape 1 and the unbalance resulting from the track deviation, the detection error of tracking is small, the optical system is simple and tracking is possible by one optical beam.

Figure 23:
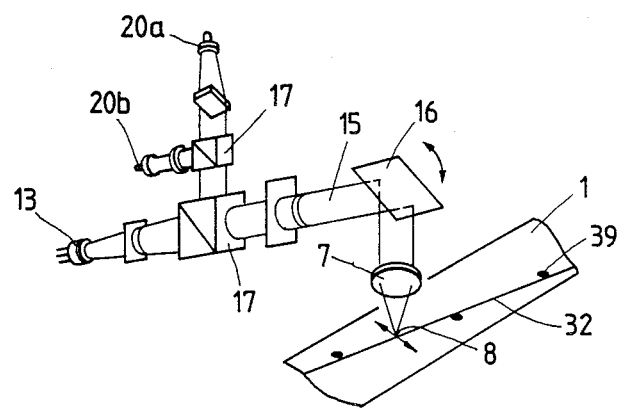
FIG. 23 is an explanatory view of the optical head.
Figure 24:
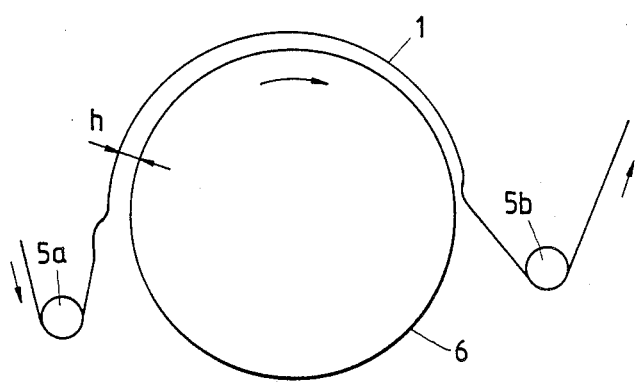
FIG. 24 is an explanatory view showing the gap between the tape and the drum when the tape travels.

As can be seen from FIG. 23 showing the structural example, the optical head 3 condenses the laser beam 15 into a diameter of about 1 μm on the optical tape by the condenser (objective) lens 7. The reflected beam 46 is detected by the photo detector 20b for focus and the photo detector 20a for tracking so that the laser beam 15 forms the focus on the target signal recording track 32 to make automatic focusing and tracking.

In FIG. 19, incidentally, the guiding track signals 39 in the checkerboard arrangement are recorded once per revolution of the tape guide 5 by the four optical heads 34, but the number of times of recording to be made once and its intervals a, b vary with the travelling speed of the optical tape 1 and with the tracking performance of the signal recording tracks 32. Therefore, the present invention does not limit the numeric values described above.

Figure 20:
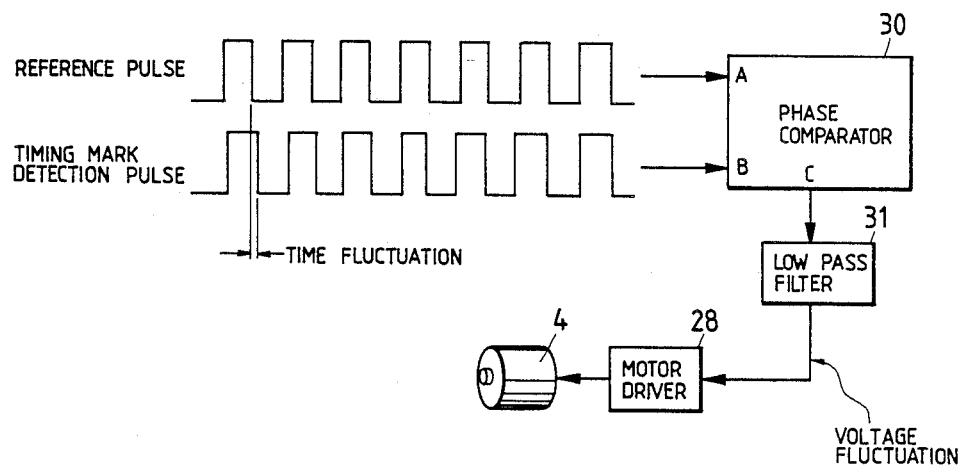
FIG. 20 is a block diagram showing a control circuit in the embodiment of FIG. 17.

Next, rotation control of the capstan motor 4 will be described. Turning back again to FIG. 17, the magnetic head 43 disposed immediately before winding of the optical tape 1 on the drum 6 reads the timing mark 38 recorded upwardly, for example, on the perpendicular magnetic film as the change of the magnetic field from the optical tape 1. As shown in FIG. 20, for example, the change of the time intervals of the timing marks 38 is detected by comparing the phases of the reference frequency corresponding to the moving speed and timing mark 38 with each other. The change of the time intervals of the timing marks 38 detected by the phase comparator 30 is converted to the fluctuation of the driving voltage in the capstan motor 4 for taking up the optical tape 1 and the capstan motor driver 28 controls the rotation of the capstan motor 4 so that the travelling speed of the optical tape 1 becomes always constant. The optical head 3 is incorporated in the drum 6, rotates highly accurately, and travels at a constant speed while floating up by a few microns on the drum 6.

The position at which the optical head 3 starts scanning the optical tape 1 is determined on the basis of the signal from an encoder (not shown) disposed downstream of the drum 6, for example, and the optical head 3 starts tracking at the timing from the encoder in accordance with the guiding track signals 39 on the optical tape 1. The track that is first dealt with by the optical head 3 is not always the first track and there is the case where a few tracks at the start portion are not used. However, this is not hereby handled.

Figure 21:
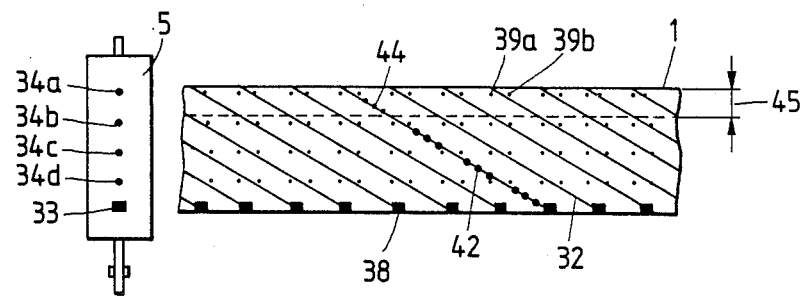
FIG. 21 is an explanatory view showing another example of the timing marks and guide tracking signals on the optical tape.

After the optical head 3 detects the guiding track signal 39 by one optical spot, the position control of the optical spot 8 is made by the galvanomirror 16 or the like so that the optical spot 8 is at the center of the track 32. At the same time, the signal processing circuit 29 gives the instruction to the optical head 3 so that the address signal 44 representing that the track is the first signal recording track is recorded in the recording area 45 of the address signal as shown in FIG. 21. After the address signal 44 is recorded, the data signals 42 are sent through the signal processing circuit 29 so that the data signals 42 are recorded between the guiding track signals 39 on the track 32 as shown in FIG. 21.

It becomes difficult to distinguish the data signal 42 and the guiding track signal 39 that are recorded on the track 32. However, since the guiding track signals 39 are deviated to the right and left to the track 32 and their recording positions are determined (38a, 38b, 38c, etc. in FIG. 19), it becomes possible to detect always only the guiding track signals 39 by sampling only the guiding track signals 39 in a predetermined time interval and detecting tracking. Speed control of the optical tape 1 is made so that the tape moves at a predetermined speed when the data signals 42 are recorded onto the next track 32. Therefore, when the drum 6 rotates once, the optical head 3 is positioned substantially at the center of the next track 32. Tracking is made on the track 32 in the same way as the recording method of the first track 32 and the address signal 44 and the data signal 42 are recorded accurately on the guiding track 32. Thereafter, recording is repeated similarly in the number of tracks corresponding to the quantity of the data signals 42.

To reproduce or re-write the data signal 42, the travelling speed of the optical tape 1 is controlled to be constant by the time interval of the timing marks 38 of the position data in the same way as in the case of recording, and the optical head 3 tracks the target signal recording track 32 on the basis of the address signal 44 recorded on the signal recording track 32. The length of the recording area 45 for recording the address signal 44 varies with the number of revolutions of the drum and the tracking performance such as the track pitch, and it is not particularly limitative in the present invention.

FIG. 21 shows an example of tracks on the optical tape. In this case, the guiding track signals 39 are recorded adjacent to one another and the deviation from the track 32 can be easily understood. In this case, too, the address signal 44 and the data signal 42 can be recorded in the same way as described above and reproduction or re-writing of the signal can be made stably.

In accordance with the present invention described above, the timing marks for detecting the position and the signals for guiding the tracks can be recorded to the accurate position in the predetermined intervals and the optical tape can travel at a constant speed by these signals. Accordingly, the data signals can be stably recorded, reproduced or re-written.

Where a signal is to be recorded again on the tape on which the signals have already been recorded on the optical tape by the method of the present invention or where the timing marks for detecting the positions on the optical tape and the signals for guiding the tracks are to be recorded in advance by other apparatuses, the timing marks and the guiding track signals need not be recorded afresh, but only the data signals may be obviously recorded, reproduced or erased by the optical head described above. The present invention can be applied to such cases without deteriorating its essence.

Therefore, the present invention can be applied to those tapes on which the guiding data are recorded either dispersedly or in the wobbling arrangement or those tapes on which the timing marks are recorded, and is not particularly limited to their recording systems and recording apparatuses.

Though the magnetic head and the semiconductor laser are shown used to record the guiding track signals in the description given above, it will be also possible to use a multi-beam semiconductor laser and a plurality of thin film magnetic heads buried in a tape guide, and the present invention is not particularly limited to the structures described above. The timing marks for detecting the speed may be disposed either at the upper side or lower side of the optical tape, and pores may be formed on the optical tape or the optical tape may be deformed by the heat of the laser, etc., besides the change of the direction of the magnetic field of the perpendicular magnetization film. Similarly, the signals for guiding the tracks may be recorded by utilizing the change of the direction of the magnetic field of the perpendicular magnetization film.

The description of the embodiment shown in FIG. 17 represents the case where the aforementioned guide plate 2 is not disposed. If the guide plate 2 is disposed, the fluctuation of the optical tape 1 during its travel becomes small and focus control becomes easier. Though the description does not mention the actuator structure of the optical head 3 for focus control and tracking control, it is obviously possible to employ the focus control utilizing the actuator using the afore-mentioned piezoelectric oscillators 21, 22 and the wavelength change of the semiconductor laser 3. It is also possible to use, as the optical head 3, the integrated optical head which is integrated by the optical waveguide technique described in Japanese Patent Laid-Open No. 248244/ 1986. Though the description of the guiding signals and the timing marks has been made about the case where the optical head is located in the rotating drum, the present invention can be applied to the case where the optical head is fixed outside the drum and the signals are recorded on the optical tape wound helically on the rotating drum.

What is claimed is:

1. An optical tape apparatus comprising:
   transporting means for transporting an optical tape comprising an optical recording medium;
   an optical head for recording, reproducing, or rewriting data on the tape by directing an optical beam onto the tape while the tape is being transported by the transporting means and scanning the beam across the tape at a predetermined angle with respect to a longitudinal dimension of the tape; and
   a recording head disposed in advance of the optical head with respect to a direction in which the tape is transported by the transporting means for recording control data on the tape, wherein the control data is to be used in controlling the operation of at least one of the transporting means and the optical head.

2. An optical tape apparatus according to claim 1, wherein the recording head records the control data at dispersed locations on the tape.

3. An optical tape apparatus according to claim 2, wherein the optical head scans the beam across the tape along signal tracks on the tape which are oriented at the predetermined angle, and wherein at least some of the control data is alternately recorded on different sides of the tracks.

4. An optical tape apparatus according to claim 1, wherein the recording head contacts the tape and is rotated by the tape as the tape is being transported by the transporting means at the same speed at which the tape is being transported.

5. An optical tape apparatus according to claim 1, wherein the control data comprises timing marks to be used in detecting the speed at which the tape is being transported by the transporting means, and wherein the recording head records the timing marks at predetermined intervals along an edge of the tape.

6. An optical tape apparatus according to claim 5, further comprising a reading head for detecting the timing marks, wherein the optical head records address signals on the tape at places where data is to be recorded before recording the data in accordance with an output of the reading head.

7. An optical tape apparatus according to claim 5, further comprising:
   a reading head for detecting the timing marks; and
   means for controlling the transporting means in accordance with an output of the reading head such that the transporting means transports the tape at a constant speed.

8. An optical tape apparatus comprising:
   means for transporting in a longitudinal direction an optical tape comprising an optical recording medium on which control data comprising tracking signals is recorded at dispersed locations in the longitudinal direction; and
   an optical head for recording, reproducing, or rewriting data on the tape and detecting the tracking signals recorded on the tape by directing an optical beam onto the tape while the tape is being transported by the transporting means and scanning the beam across the tape at a predetermined angle with respect to the longitudinal direction;
   wherein the optical head includes a tracking mechanism for controlling the position of the beam on the tape in accordance with the detected tracking signals.

9. An optical tape apparatus according to claim 8, wherein the control data further comprises timing marks, and further comprising:
   a reading head for detecting the timing marks; and
   means for controlling the transporting means in accordance with an output of the reading head such that the transporting means transports the tape at a constant speed.

10. An optical tape apparatus comprising:
    means for transporting an optical tape comprising an optical recording medium in a longitudinal direction; and
    an optical head for recording, reproducing, or rewriting data on the tape by directing an optical beam onto the tape while the tape is being transported by the transporting means and scanning the beam across the tape at a predetermined angle with respect to the longitudinal direction;
    wherein the optical head comprises:
    a semiconductor laser for emitting an optical beam; and
    an optical system exhibiting chromatic aberration for directing the beam emitted by the laser onto the tape;
    wherein the beam is reflected from the tape after being directed onto the tape, and wherein the optical system focuses the directed beam onto the tape by changing the wavelength of the beam emitted by the laser by directing part of the reflected beam back to the laser, thereby changing the focal point of the beam by virtue of the chromatic aberration of the optical system.

11. An optical tape apparatus according to claim 10, wherein the optical system comprises a collimator lens exhibiting chromatic aberration for collimating the beam emitted by the laser.

12. An optical tape apparatus according to claim 11, further comprising a rotatable drum in which the optical head is disposed, wherein the collimator lens is disposed near the center of rotation of the drum.

13. An optical tape apparatus according to claim 10, wherein the optical system comprises a condenser lens exhibiting chromatic aberration for focusing the beam emitted by the laser onto the tape.

14. An optical tape apparatus according to claim 10, further comprising a guide plate disposed between the tape and the optical head for stabilizing the tape while it is being transported by the transporting means so as to eliminate fluctuations in the position of the tape with respect to the optical head.

15. An optical tape apparatus according to claim 14, wherein the optical head is rotatable, and wherein the guide plate has an arcuate or circular shape which is concentric with the center of rotation of the optical head.

16. An optical tape apparatus according to claim 14, wherein the guide plate is made of a transparent material having a very smooth surface such as glass or plastic resin.

17. An optical tape apparatus according to claim 14, wherein the guide plate is from 1 to 2 mm thick.

18. An optical tape apparatus according to claim 10, further comprising a drum in which the optical head is rotatably disposed and on which the tape is wound while being transported by the transporting means, wherein the drum is provided with a slit at a portion of the drum on which the tape is wound and comprises a guide plate disposed at the slit for stabilizing the tape while the tape is being transported by the transporting means.

19. An optical tape apparatus according to claim 18, wherein the guide plate projects from the surface of the drum and contacts the tape while the tape is being transported by the transporting means.

20. An optical tape apparatus according to claim 18, wherein the guide plate is a condenser lens which is part of the optical system and is for focusing the beam emitted by the laser onto the tape.

21. An optical tape apparatus according to claim 10, further comprising a drum in which the optical head is rotatably mounted and on which the tape is wound while being transported by the transporting means, wherein the drum is made of a transparent material having a very smooth surface such as glass or plastic resin.

22. An optical tape apparatus according to claim 10, wherein the optical system comprises:
   a condenser lens for focusing the beam emitted by the laser onto the tape; and
   a piezoelectric actuator for supporting the condenser lens and for focusing the beam onto the tape by moving the condenser lens.

23. An optical tape apparatus according to claim 22, wherein the optical head is rotatable, and wherein the piezoelectric actuator supports the condenser lens at a position while the optical head is not rotating which is displaced from a desired position of the condenser lens while the optical head is rotating such that when the optical head is rotating, a centrifugal force acting on the condenser lens displaces the condenser lens to the desired position against resistance provided by the piezoelectric actuator.

24. An optical tape apparatus according to claim 10, further comprising:
   a second optical head of the type recited in claim 10; and
   a rotatable drum in which the two optical heads are disposed symmetrically with respect to the center of rotation of the drum and on which the tape is wound while being transported by the transporting means.

25. An optical tape apparatus according to claim 10, further comprising a recording head disposed in advance of the optical head with respect to the longitudinal direction in which the tape is transported by the transported means for recording control data on the tape, wherein the control data is to be used in controlling the operation of at least one of the transporting means and the optical head.

26. An optical tape apparatus according to claim 25, wherein the control data comprises timing marks recorded at dispersed locations on the tape to be used in detecting the speed at which the tape is being transported by the transporting means, and further comprising:
   a reading head for detecting the timing marks; and
   means for controlling the transporting means in accordance with an output of the reading means such that the transporting means transports the tape at a constant speed.

* * * * *